Nov. 26, 1968  K. HERGENHAN  3,413,591
COMBINED FASTENER, INSULATOR AND SOLDERING TERMINAL
FOR ELECTRICAL COMPONENTS
Filed Feb. 14, 1967

KARL HERGENHAN
INVENTOR.

BY Rudolph J. Jurick
ATTORNEY

United States Patent Office 3,413,591
Patented Nov. 26, 1968

3,413,591
COMBINED FASTENER, INSULATOR AND SOLDERING TERMINAL FOR ELECTRICAL COMPONENTS
Karl Hergenhan, Rte. 3, Box 4, Somerville, N.J. 08876
Filed Feb. 14, 1967, Ser. No. 616,044
6 Claims. (Cl. 339—33)

ABSTRACT OF THE DISCLOSURE

A fastener comprising an internally-threaded, metal insert molded in an insulating body and having an integral portion projecting from one end of the body to form a soldering lug. A reduced-diameter collar formed at the other end of the body extends into a hole formed in a panel when the fastener is threaded onto a stud-type electrical component for panel mounting thereof, said body also including integral means providing a self-locking action.

Background of the invention

Stud-type electrical components, such as transistors and power diodes, include a threaded stud adapted to extend through a hole formed in a chassis and to receive a fastening nut. In accordance with present practice, a separate soldering lug and one or more insulator members are inserted over the stud and clampingly secured to the panel by the nut, thereby to electrically isolate the stud from the panel and to facilitate the soldering of a wire lead thereto. In accordance with this invention, the fastening nut, insulator member and soldering lug comprise a unitary assemblage. Such unit facilitates the fastening of the component to the chassis and eliminates the need for the user to carry a supply of numerous separate parts. Also, the fastener is constructed to provide a self-locking action, thereby to retain the component firmly secured to the chassis.

Summary of the invention

A body of insulating material has an undercut, reduced-diameter end and is molded about an internally-threaded metal insert having a projecting end portion forming a soldering lug. Such unit is adapted for threading onto a stud of an electrical component, which stud extends through a hole formed in a chassis or mounting panel, thereby to secure the component to the chassis. The reduced-diameter end of the body extends into such hole, thereby electrically isolating the stud from the chassis, and an undercut surface provides a self-locking action.

An object of this invention is the provision of an improved fastener for securing a stud-type electrical component to a chassis and electrically isolating the stud from the chassis.

An object of this invention is the provision of a fastener for securing a stud-type electrical component to a metal mounting panel, which fastener comprises a unitary assemblage of a fastening nut, soldering lug and an insulating body, said body electrically isolating the stud from the panel and including means to lock the fastener in place.

The above-stated and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Brief description of the drawings

In the drawings wherein like reference characters denote like parts in the several views:

Referring to FIGURES 1–3, a fastener made in accordance with one embodiment of this invention comprises an internally-threaded brass insert 10 molded in a body 11 made of an insulating material such as a plastic, said body having the configuration of a hexagonal nut. An integral ear 12 extends upwardly from the insert and projects beyond the body, said ear having a hole formed therein for receiving a lead wire to be connected to the insert, as by soldering. The lower end of the body is of a reduced diameter forming a circular collar 13 which serves to center the fastener in a hole formed in a panel or chassis, and the contiguous end surface 14, of the body, is undercut to provide a self-locking action when the fastener is applied to a stud passing through such hole.

FIGURE 4 shows a power diode 15 mounted on a chassis 16. The diode stud 17 extends through a hole formed in the chassis and the case of the diode is electrically insulated from the chassis by an insulating washer 18. The fastening device is threaded onto the diode stud with the shoulder 13 directed into the chassis hole. Thereafter, the fastener is drawn up tightly against the chassis to force the undercut surface 14 into flush engagement with the chassis. The resulting pressure, depending upon the compressive character of the particular material of which the fastener body is made, results in a generally axial force applied to the diode stud, thereby providing a self-locking action to retain the diode securely mounted to the chassis. It will be apparent that the diode stud is electrically isolated from the chassis and is connectable to an external circuit by means of a lead soldered to the ear, or lug 12.

Figure 2:
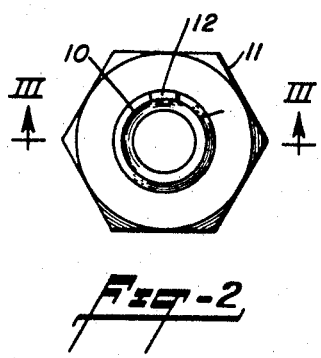
FIGURE 2 is a top plan view thereof.
Figure 3:
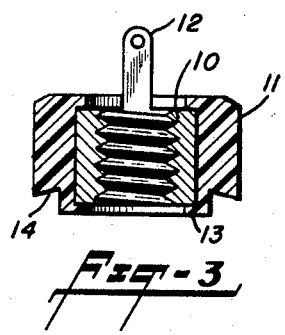
FIGURE 3 is a cross-sectional view taken along the line III—III of FIGURE 2.
Figure 1:
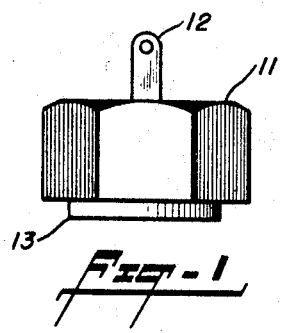
FIGURE 1 is an elevational view showing a fastener made in accordance with one embodiment of this invention.
Figure 4:
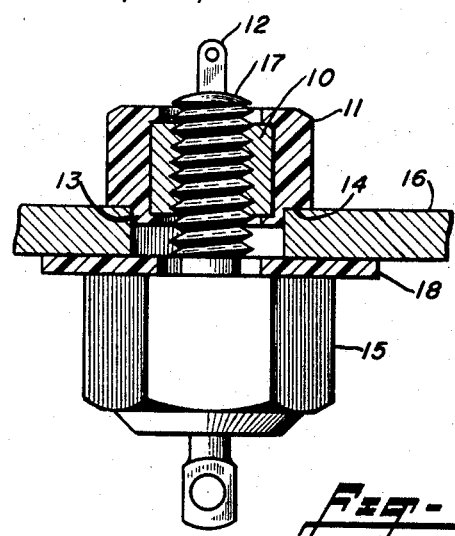
FIGURE 4 is a cross-sectional view showing a power diode secured to a chassis by a fastener made as shown in FIGURES 1–3.
Figure 6:
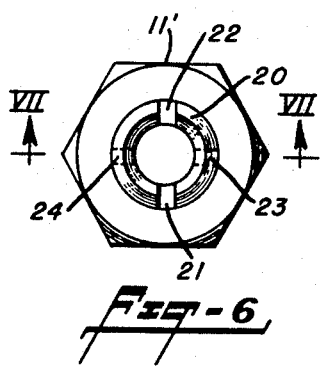
FIGURE 6 is a top plan view thereof.
Figure 5:
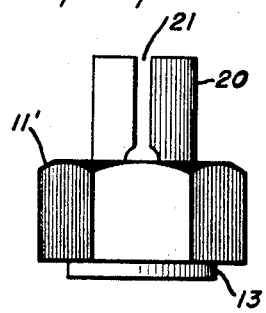
FIGURE 5 is an elevational view of a fastener made in accordance with another embodiment of the invention.
Figure 7:
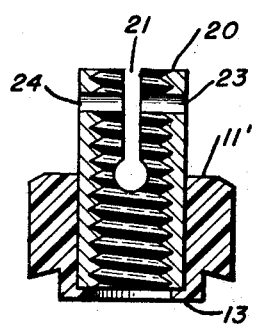
FIGURE 7 is a cross-sectional view taken along the line VII—VII of FIGURE 6.

A modification of the fastener is shown in FIGURES 5–7. Here, the internally-threaded insert 20 is of an extended length and has formed therein diametrically-opposed, longitudinal slots 21, 22 and radial holes 23, 24. Such insert is molded in an insulator body 11' of the same general configuration as that described with reference to FIGURES 1–3. The radial holes and the longitudinal slots are adapted to receive circular or rectangular connection leads, respectively, thereby to connect the diode stud to an electrical circuit. The projecting portion of the insert 20 has a cross-sectional area exceeding that of the ear 12 (see FIGURE 3), thereby resulting in an increased current-carrying capacity.

Figure 8:
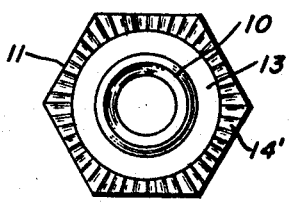
FIGURE 8 is a bottom plan view showing a serrated surface formed on that end portion of the fastener which engages the panel.

Referring to the bottom plan view of FIGURE 8, the undercut end surface 14', of the body 11, may be serrated, thereby to provide an increased self-locking action when the fastener is secured to the threaded stud of the diode.

Having now described the invention, those skilled in this art will be able to make various changes and modifications without thereby departing from the spirit and scope of the invention as recited in the following claims.

I claim:

1. A fastener for securing a stud-type electrical component to a metal panel of a given thickness and having a hole formed therein, said fastener comprising:

(a) a body made of electrical insulating material and having a reduced-diameter circular collar extending from one end thereof, which collar has an axial length less than the thickness of the panel and extends into the panel hole when the contiguous surface of the body is in engagement with the panel, and (b) a hollow internally-threaded metal insert carried by said body, said insert having an integral portion projecting from the other end of the body and constituting a soldering lug.

2. The invention as recited in claim 1, wherein the said body has a hexagonal configuration and the said insert is molded into the body.

3. The invention as recited in claim 1, wherein the said contiguous end surface of the body is undercut.

4. The invention as recited in claim 1, wherein the projecting portion of the insert has longitudinal slots formed in the wall thereof.

5. The invention as recited in claim 4, wherein the projecting portion of the insert also has radial holes formed in the wall thereof.

6. The invention as recited in claim 1, wherein the internally-threaded portion of said insert has an axial length less than that of the said body, and wherein the projecting portion of the insert is an axially-extending ear.

References Cited

UNITED STATES PATENTS

| | | |
|---|---|---|
| 2,041,809 | 5/1936 | Bernhard. |
| 2,106,595 | 1/1938 | Draving _____ 339—221 X |
| 2,854,099 | 9/1958 | Damon _____ 151—7 X |
| 2,931,007 | 3/1960 | Abrams _____ 339—130 X |
| 2,962,691 | 11/1960 | Mande et al. _____ 339—214 |
| 3,200,367 | 8/1965 | Blanchenot _____ 339—97 X |

RICHARD E. MOORE, *Primary Examiner.*